May 26, 1970 H. K. GRAVES Re. 26,894

PIANO SOUND BOARD

Original Filed Oct. 22, 1965

HOWARD K. GRAVES
INVENTOR.

United States Patent Office

Re. 26,894
Reissued May 26, 1970

26,894

PIANO SOUND BOARD

Howard K. Graves, 6633 Somerset Drive,
Brecksville, Ohio 44141

Original No. 3,312,136, dated Apr. 4, 1967, Ser. No. 501,661, Oct. 22, 1965. Application for reissue Apr. 3, 1969, Ser. No. 817,240
Int. Cl. G10c *3/06, 3/04*
U.S. Cl. 84—192 10 Claims

Matter enclosed in heavy brackets [ ] appears in the original patent but forms no part of this reissue specification; matter printed in italics indicates the additions made by reissue.

*ABSTRACT OF THE DISCLOSURE*

*Piano having strings tensioned on a frame and a bridge coupling these strings to a sound board. Stiffening means is coupled between the bridge and the frame to stiffen the system at the bridge. A sound board has one edge portion tightly coupled to the frame so that it cannot move with respect to the frame in a direction laterally to the edge portion. The sound board has an opposing edge portion which is loosely coupled to the frame.*

This invention relates to sound boards for stringed musical instruments, and more particularly relates to an improved sound board for pianos.

The sound board of a piano radiates into the air the sound energy of the vibrating strings. The sound board serves as an acoustical coupling between the strings and the air. The sound board is driven by the strings through a bridge that forms one of the vibrational ends of the strings.

The vibrating strings must be supported at the bridge by a proper degree of acoustical stiffness. This acoustical stiffness regulates the rate at which energy is transferred from the vibrating strings to the air. Each string must be supported at the bridge with a proper degree of acoustical stiffness for the tone to be pleasing. If the degree of stiffness is not sufficient, the energy of the string will be transferred to the air too rapidly and the tone will sound like a dull thud. If the degree of stiffness is excessive, the energy of the string will not be transferred rapidly enough and the tone will be thin. The proper degree of stiffness is a function of both the frequency of the string and the tension of the string. Higher pitched strings require more stiffness than lower pitched strings, and higher tensioned strings require more stiffness than lower tensioned strings.

The sound board of a conventional piano performs two functions: it radiates sound and it supports the strings. The conventional sound board is a wooden, structural diaphragm that is secured to the frame or case of the instrument. The required acoustical stiffness at the bridge is provided by the structural plate rigidity of the diaphragm. The sound board radiates sound energy into the air by vibrating diaphragmatically with the bridge as a driving point.

The requirements that the sound board both radiate sound and provide a stiff support for the strings are mutually conflicting. A sound board that is sufficiently stiff to support the strings with the required degree of acoustical stiffness is not sufficiently light and free to be able to respond to the subtleties of the piano tone. The sound board is restrained in its vibratory motion because the edges are rigidly mounted to the frame. The conventional sound board is not an efficient radiator of sound.

The diaphragmatic mounting of the conventional structural sound board does not provide the proper degree of stiffness throughout the length of the bridge. The stiffness at any particular point on the bridge is dependent upon the distance of the point from the edges of the sound board. The treble region is quite stiff, the center register is less stiff, but the bass register is more stiff due to its increased proximity to the edge of the sound board. Unfortunately the bass notes should be supported with the least degree of stiffness. The bass notes of a conventional piano are normally too stiffly supported.

Various means have been employed in an attempt to decrease the acoustical stiffness of the support of the bass strings. One means, that is employed on most pianos, is to overstring the bass register by using a separate bass bridge that is mounted away from the edge of the sound board. The result is only partially satisfactory because the proper gradation of stiffness is not achieved.

This invention discloses a novel method of constructing a piano in which means for radiating the sound and means for providing the acoustical stiffness at the bridge are accomplished by two different members. The separation of the sound radiating means from the stiffness means allows the sound radiator to be designed as an efficient, responsive radiator of sound, and allows the acoustical stiffness at the bridge to be designed to be optimum for each string. A greatly improved balance of sound radiating properties and a proper gradation of stiffness are thus possible with this invention.

In this invention, the sound board is mounted to the frame along one edge and is essentially vibrationally free along the other edges. The sound board is mounted to the frame acoustically relatively tightly along the edge parallel to the hammer strike line and opposite to the bridge, and is acoustically relatively loosely coupled to the frame along the sides and edge adjacent to the bridge. This duo mounting method permits the sound board to vibrate in a generally pivotal manner in which the radiating surface vibrates pivotally about the tightly coupled edge. The loose coupling of the sound board to the frame along the other edges permits the sound board to vibrate generally freely and unrestrained under the driving action of the bridge.

The mounting of the sound board to the frame, or case, must be properly accomplished so that the sound board vibrates, at least in its fundamental mode, in a generally angular manner. The sound board must be relatively tightly coupled to the frame along its mounted edge. The sound board may be rigidly coupled in which case the tightly coupled edge does not translate or rotate relative to the frame, and the angular vibrational motion is accomplished by the flexure of the sound board itself in the vicinity of the mounted edge. The sound board may be pivotally coupled to the frame along its mounted edge, in which case the sound board does not translate but may rotate along its mounted edge. The sound board may be stiffly coupled to the frame along its mounted edge. The stiff support would allow the generally fixed edge of the sound board to vibrate, both translatory and rotary, although such vibration of the generally fixed edge would necessarily be small.

The sound board must be relatively loosely coupled to the frame along its generally vibrationally free edge so that the sound board may vibrate in a generally angular manner. The least possible coupling between the free edge of the sound board and the frame is a complete absence of any physical connection; a freely suspended edge. The loosely coupled edge of the sound radiator may be compliantly mounted to the frame. A compliant mount somewhat restrains the motion of the free edge of the sound board, but some degree of vibrational freedom is afforded.

The relative gradations of the tightness or looseness of the coupling of the edge of the sound board to the frame are, in decreasing order of tightness: rigid, pivoted, stiff, compliant, and free. A rigid, pivoted, or stiff coupling are a relatively tight coupling, and a compliant, or free coupling are a relatively loose coupling.

For the purpose of definition, a relatively tight coupling between the frame and the edge of the sound board is a coupling in which the amplitude of the vibration of the edge of the sound board is small in comparison to the amplitude of vibration of the bridge. A relatively loose coupling between the frame and edge of the sound board is a coupling in which the amplitude of vibration of the edge of the sound board is of the same order as the amplitude of vibration of the bridge.

The degree of coupling that constitutes a tight coupling and the degree of coupling that constitutes a loose coupling are dependent upon the acoustical parameters of the string-sound board system. Thus a tight coupling and a loose coupling of the edge of the sound board to the frame can be defined in terms of each other. A relatively tight coupling of the sound board to the frame together with a relatively loose coupling of the sound board to the frame cooperate so as to support the sound board in such a manner that the sound board may vibrate under the action of the strings, in a generally angular vibrational manner.

In this invention the acoustical stiffness at the bridge is provided by springs that are disposed between the bridge and an extension of the frame that lies beneath the bridge. The spring constant of these springs is varied along the length of the bridge to provide the proper degree of stiffness for each note.

The sound board in this invention can be made from a variety of materials and can be constructed in a variety of modes. It can be made from wood, metal, plastic, foamed plastic, or paper. The sound radiator, for best results, should be designed so that it possess sufficient strength to withstand the inertial and air loads.

A preferred embodiment of the invention is illustrated in the accompanying drawings in which.

Figure 1:
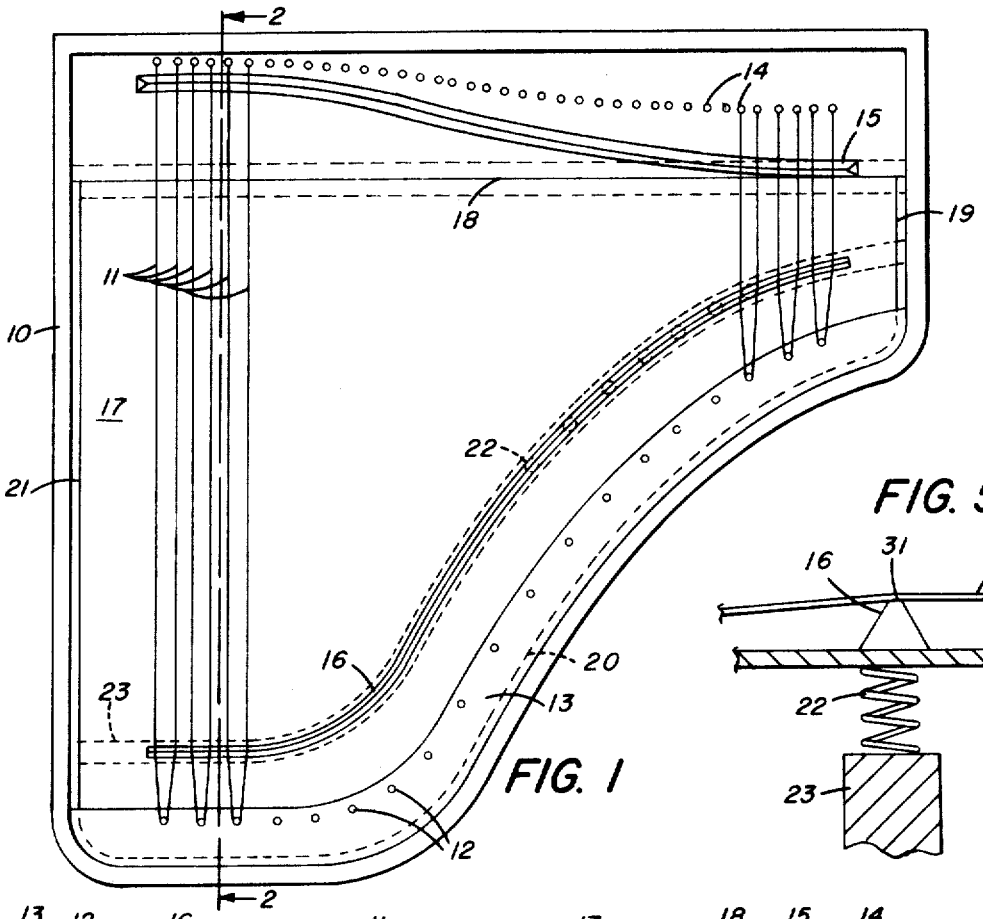
FIGURE 1 is a plan view of the piano frame-string-sound board system showing the layout of the frame, the strings, and the sound board.

Referring to the drawings, FIGURE 1 shows a frame-string-sound board system constructed in accordance with the principles of this invention. A frame 10 such as might be used in a piano tensionally supports a full complement of musical strings indicated in general by numeral 11. The tail end of each of the strings it attached by means of a hitch pin 12 to the hitch portion 13 of frame 10. The head end of each of the strings is attached to frame 10 by means of a tuning pin 14.

The strings 11 vibrate between fixed bar 15, that is part of frame 10, and vibrating bridge 16. Bridge 16 is secured with glue to sound board 17. Sound board 17 is acoustically tightly coupled to frame 10 along mounting edge 18, and is acoustically loosely coupled to frame 10 along suspended edges 19, 20, and 21. The sound board, by this duo mounting method, is free to vibrate in an angular manner in which it pivots along mounting edge 18, and freely vibrates along the suspended edges 19, 20, and 21.

The acoustical stiffness at bridge 16 is provided by the plurality of springs 22 that are disposed between the sound board 17 under bridge 16 and a portion of the frame 23 that extends in spaced proximity to bridge 16.

The springs 22 provide the acoustical stiffness with which bridge 16 must be supported to produce a pleasing tone. The springs can be placed one under each string, under groups of strings, or a single spring member could be extended along the entire length of the bridge.

Figure 2:
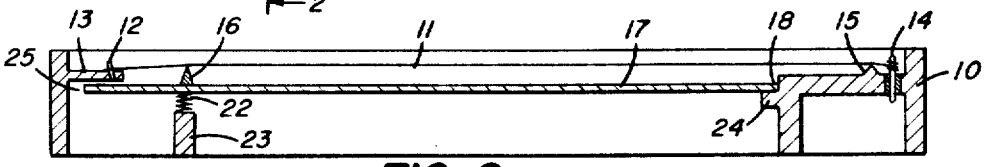
FIGURE 2 is a sectional view along line 2—2 in FIGURE 1 showing a sound board that is rigidly mounted and freely suspended.

FIGURE 2 shows one method of relatively tightly coupling sound board 17 along edge 18 to frame 10 and one method of relatively loosely coupling the sound board along edges 19, 20, and 21 to frame 10. The sound board 17 is rigidly secured with glue to mounting projection 24 on frame 10. The gluing of the sound board directly to the frame forms a rigid coupling that prevents the edge 18 of the sound board from vibrating or rotating relative to the frame.

The sound board 17 is freely suspended at 25 along edges 19, 20, and 21. The absence of physical contact between sound board 17 and frame 10 provides the loosest possible acoustical coupling between the sound board and the frame.

Figure 3:
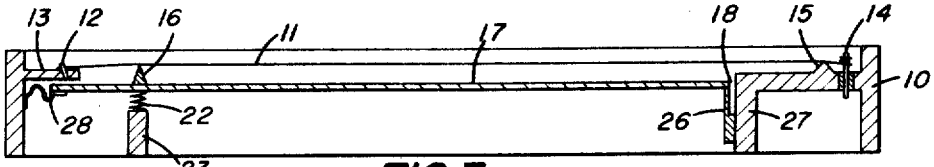
FIGURE 3 is a sectional view along line 2—2 in FIGURE 1 showing a sound board that is pivotally mounted and compliantly suspended.

FIGURE 3 shows another method of relatively tightly coupling sound board 17 along edge 18 to frame 10, and another method of relatively loosely coupling the sound board along edges 19, 20, and 21 to frame 10. The sound board 17 is pivotally secured to frame 10 by means of flexural pivot member 26. Flexural pivot member 26 is secured with glue to the edge 18 of sound board 17. Flexural pivot member 26 is secured with glue to projection 27 of frame 10. The flexural member permits the sound board to pivot generally about edge 18, yet fully restrains its translatory vibratory movement in a plane normal to the strings.

The sound board 17 is relatively loosely coupled to frame 17 along the edges 19, 20, and 21 by means of a compliant member 28. Compliant member 28 is secured with glue to frame 10 and is secured with glue to sound board 17. A compliant mount can also be fashioned by flexibly corrugating the edges 19, 20, and 21 of the sound board. A compliant mount provides a relatively loose coupling between the sound board and the frame.

Figure 4:
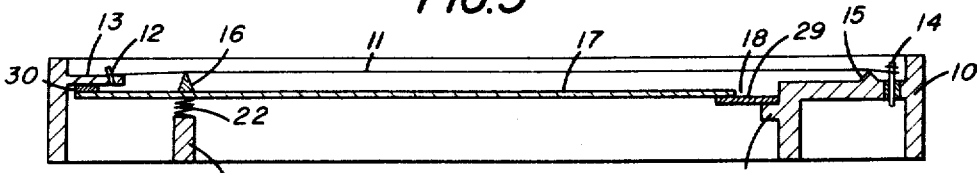
FIGURE 4 is a sectional view along line 2—2 in FIGURE 1 showing a sound board that is stiffly mounted and resiliently suspended.

FIGURE 4 shows still another method of relatively tightly coupling sound board 17 along edge 18 to frame 10, and a variation of a method of relatively loosely coupling the sound board along edges 19, 20, and 21 to frame 10. Sound board 17 is relatively tightly coupled to frame 10 by means of stiff member 29. Stiff member 29 is secured with glue to edge 18 of sound board 17, and is secured with glue to mounting projection 24 on frame 10. Stiff member 29, because of its cantilever deflection, allows the edge 18 of sound board 17 to vibrate in a highly restrained manner.

The sound board 17 is relatively loosely coupled to frame 17 along the edges 19, 20, and 21 by means of a compliant member 30. Compliant member 30 can be any elastic material such as soft rubber, foamed plastic, and the like. Compliant member 30 is secured with glue to the edge of sound board 17 and is secured with glue to hitch pin support 13 on frame 10. The compliant member may restrain the motion of edges 19, 20, and 21 of sound board 17, but still allow the sound board to vibrate in a somewhat angular manner.

Figure 5:
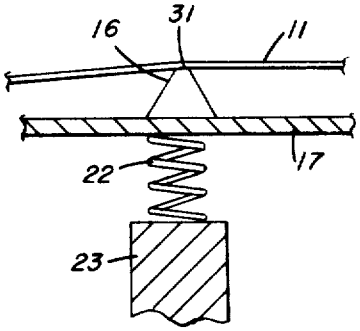
FIGURE 5 is an enlarged detail section along line 2—2 in FIGURE 1 showing the stiffness means.

FIGURE 5 is an enlarged detail of the spring stiffness means. String 11 passes over bridge 16. The slight downward angle, or downbearing of string 11 after it passes over bridge 16, causes the string to be tightly coupled to bridge 16 at bridge point 31. Bridge point 31 must be provided with a proper degree of acoustical stiffness for the musical tone to be pleasing. The acoustical stiffness at bridge point 31 is provided by a stiff member 22 that is disposed between the sound board 17 and the frame projection 23. The stiff member 22 is coupled to bridge point 31 through sound board 17 and bridge 16. The stiff member 22 is shown as a spring.

The foregoing disclosure has been described for a sound board, such as might be used in a piano in which the means for radiating sound and the means for providing acoustical stiffness are accomplished by separate members; and in which the sound board vibrates in an angular manner due to mounting one edge of the sound board relatively tightly to the frame, and the other edges relatively loosely to the frame.

This invention has been disclosed as being applicable to a piano, but it will be apparent to one skilled in the art that the invention is also applicable to other stringed musical instruments.

It will herein be understood, of course, that these embodiments of the invention have been used for illustrative purposes only and that various modifications and variations in the present invention may be effected without departing from the spirit and scope of the novel concepts thereof.

I claim:

1. A stringed musical instrument comprising:

a frame, a plurality of strings tensionally supported by said frame, bridge means coupled to said strings, stiffening means coupled between said bridge means and said frame, and sound radiator means coupled to said bridge means, part of the periphery of said sound radiator means being acoustically relatively tightly coupled to said frame and part of the periphery of said sound radiator means being acoustically relatively loosely coupled to said frame.

2. A stringed musical instrument comprising:

a frame, a plurality of strings tensionally supported by said frame, bridge means coupled to said strings, stiffening means coupled between said bridge means and said frame, and sound radiator means coupled to said bridge means, said sound radiator means being acoustically relatively tightly coupled to said frame along the edge opposite from said bridge means, and being acoustically relatively loosely coupled to said frame along the edge adjacent to said bridge means.

3. A stringed musical instrument in accordance with claim 2 wherein:

said sound radiator means is rigidly coupled to said frame along the edge opposite from said bridge means, and is complaintly coupled to said frame along the edge adjacent to said bridge means.

4. A stringed musical instrument in accordance with claim 2 wherein:

said sound radiator means is rigidly coupled to said frame along the edge opposite from said bridge means, and is freely suspended along the edge adjacent to said bridge means.

5. A stringed musical instrument in accordance with claim 2 wherein:

said sound radiator means is pivotally coupled to said frame along the edge opposite from said bridge means, and is compliantly coupled to said frame along the edge adjacent to said bridge means.

6. A stringed musical instrument in accordance with claim 2 wherein:

said sound radiator means is pivotally coupled to said frame along the edge opposite from said bridge means, and is freely suspended along the edge adjacent to said bridge means.

7. A stringed musical instrument in accordance with claim 2 wherein:

said sound radiator means is stiffly coupled to said frame along the edge opposite from said bridge means, and is compliantly coupled to said frame along the edge adjacent to said bridge means.

8. A stringed musical instrument in accordance with claim 2 wherein:

said sound radiator means is stiffly coupled to said frame along the edge opposite from said bridge means, and is freely suspended along the edge adjacent to said bridge means.

*9. In a stringed instrument, a frame, a plurality of strings tensioned on said frame, a sound board system comprising a sound board having a first edge portion extending transversely of said strings adjacent one of the ends of said strings and loosely coupled to said frame and a second edge portion extending transversely to said strings at the other ends thereof, connecting means along said second edge portion tightly coupling said sound board to said frame and constraining said second edge portion against movement laterally of said second edge portion at said strings and thereby constraining said sound board to move angularly about said second edge portion, and bridge means extending transversely of said strings adjacent said one end of said strings and adjacent said first edge portion and coupling said strings to said sound board.*

*10. In a stringed instrument, a frame, a plurality of strings tensioned on said frame, a sound board system comprising a sound board having a first edge portion extending transversely of said strings and loosely coupled to said frame and a second edge portion opposed to said first edge portion and extending transversely of said strings, and connecting means along said second edge portion tightly coupling said sound board to said frame and holding said second edge portion against movement with respect to said frame and thereby constraining said sound board to move angularly about said second edge portion, and bridge means extending transversely of said strings and coupling said strings to said sound board.*

References Cited

The following references, cited by the Examiner, are of record in the patented file of this patent or the original patent.

UNITED STATES PATENTS

| | | | |
|---|---|---|---|
| 2,229,440 | 1/1941 | Carlisle | 84—192 |
| 2,760,398 | 8/1956 | Caspersen | 84—192 |
| 3,236,138 | 2/1966 | Graves | 84—212 X |

RICHARD B. WILKINSON, Primary Examiner

J. F. GONZALES, Assistant Examiner

U.S. Cl. X.R.

84—212